United States Patent
Zhao et al.

(10) Patent No.: US 12,335,952 B2
(45) Date of Patent: Jun. 17, 2025

(54) NR CONTROL CHANNEL ELEMENT DETECTIONS TO REDUCE BLIND DEMODULATION AND DECODING

(71) Applicant: Apple Inc., Cupertino, CA (US)

(72) Inventors: Wanlun Zhao, San Diego, CA (US); Parvathanathan Subrahmanya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 17/879,601

(22) Filed: Aug. 2, 2022

(65) Prior Publication Data

US 2023/0042362 A1 Feb. 9, 2023

Related U.S. Application Data

(60) Provisional application No. 63/229,782, filed on Aug. 5, 2021.

(51) Int. Cl.
*H04W 72/20* (2023.01)
*H04L 5/00* (2006.01)
*H04W 52/02* (2009.01)

(52) U.S. Cl.
CPC ........... *H04W 72/20* (2023.01); *H04L 5/0048* (2013.01); *H04W 52/0225* (2013.01)

(58) Field of Classification Search
None
See application file for complete search history.

(56) References Cited

U.S. PATENT DOCUMENTS

| | | | |
|---|---|---|---|
| 2003/0185165 A1* | 10/2003 | Ishii | H04L 25/0232 370/347 |
| 2018/0368116 A1 | 12/2018 | Liao et al. | |
| 2020/0127772 A1* | 4/2020 | Papasakellariou | H04L 5/0053 |
| 2020/0145918 A1 | 5/2020 | Ji | |
| 2020/0351896 A1 | 11/2020 | Taherzadeh Boroujeni et al. | |
| 2021/0226754 A1* | 7/2021 | Khoshnevisan | H04L 5/0094 |

FOREIGN PATENT DOCUMENTS

WO 2020145537 7/2020

OTHER PUBLICATIONS

US 10,972,927 B2, 04/2021, Seo et al. (withdrawn)
Extended European Search Report for EP Patent Application No. 22188665.8; 11 pages; Dec. 2, 2022.

* cited by examiner

*Primary Examiner* — Sujoy K Kundu
*Assistant Examiner* — Raul Rivas
(74) *Attorney, Agent, or Firm* — Kowert, Hood, Munyon, Rankin & Goetzel, P.C.

(57) ABSTRACT

This disclosure relates to techniques for reducing blind decoding of downlink control channels in a wireless communication system. The techniques may include determining whether a control channel pilot signal, such as a demodulation reference signal (DMRS) is present within a set of control carrier entities, and accordingly determining whether the downlink control channel is present within the set of control channel elements. In this manner, a number of candidates for blind decoding may be reduced.

18 Claims, 9 Drawing Sheets

NR CONTROL CHANNEL ELEMENT DETECTIONS TO REDUCE BLIND DEMODULATION AND DECODING

PRIORITY INFORMATION

This application claims priority to U.S. provisional patent application Ser. No. 63/229,782, entitled "NR Control Channel Element Detections to Reduce Blind Demodulation and Decoding," filed Aug. 5, 2021, which is hereby incorporated by reference in its entirety as though fully and completely set forth herein.

FIELD

The present application relates to wireless communications, and more particularly to systems, apparatuses, and methods for performing blind decoding of downlink control channels with reduced resource consumption in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for reducing resource consumption in monitoring to receive a downlink control channel in a wireless communication system.

According to the techniques described, it may be possible for a wireless communication device, such as a UE device, to reduce blind decoding of downlink control channels. The techniques may include determining whether a control channel pilot signal, such as a demodulation reference signal (DMRS) is present within a set of control carrier entities, and accordingly determining whether the downlink control channel is present within the set of control channel elements. In this manner, the number of candidates for blind decoding may be reduced.

For example, a method is described for monitoring for a control channel. According to the described method, a wireless communication device may determine whether a control channel pilot signal is present within at least a first symbol of a first group of control channel elements (CCEs) of a control resource set. At least partly in response to determining that the control channel pilot signal is present within at least the first symbol of the first group of CCEs, the wireless communication device may demodulate and decode the at least the first symbol of the first group of CCEs. In response to determining that the control channel pilot signal is not present within at least the first symbol of the first group of CCEs, the wireless communication device may forego demodulation and decoding of the first group of CCEs.

The techniques described herein may thus reduce the number of control resource sets to be blind decoded while monitoring for the control channel.

In some scenarios, the wireless communication device may determine whether the control channel pilot signal is present within the first symbol of any group of CCEs of the control resource set. At least partly in response to determining that the control channel pilot signal is present within the first symbol of at least one group of CCEs, the wireless communication device may process subsequent symbols of the at least one group of CCEs. In response to determining that the control channel pilot signal is not present within the first symbol of any group of CCEs of the control resource set, the wireless communication device may forego processing of the remaining symbols of the control resource set. In some such scenarios, foregoing processing may include foregoing demodulation and decoding of the remaining symbols of the control resource set. In some such scenarios, foregoing processing may include transitioning transceiver circuitry configured to receive the control resource set to a low-power state.

In some scenarios, determining whether the control channel pilot signal is present within at least the first symbol of the first group of CCEs may include: determining a signal strength metric for at least the first symbol of the first group of CCEs; and determining that the control channel pilot signal is not present within at least the first symbol of the first group of CCEs when the signal strength metric does not meet a group signal strength threshold (T1).

In some scenarios, the signal strength metric for at least the first symbol of the first group of CCEs may be based on a sum of received samples of resource elements reserved for the control channel pilot symbol within the first group of CCEs.

In some scenarios, determining whether the control channel pilot signal is present within at least the first symbol of the first group of CCEs may include: determining a respective signal strength metric for each of a plurality of groups of CCEs of the control resource set; determining a maximum group threshold (T2), representing a predetermined percentage of a greatest signal strength metric of the respective signal strength metrics; and determining that the control channel pilot signal is not present within at least the first symbol of the first group of CCEs when the signal strength metric for at least the first symbol of the first group of CCEs does not meet $T_2$.

In some scenarios, the first group of CCEs may include a number of CCEs equal to a minimum aggregation level of the control resource set.

In some scenarios, the first group of CCEs may include all CCEs of the control resource set.

In some scenarios, the first group of CCEs may include all CCEs of a predefined search space of the control resource set.

In some scenarios, the wireless communication device may determine energy associated with data resource elements of a PDCCH candidate group of the control resource set. At least partly in response to determining that the determined energy meets a candidate energy threshold, the wireless communication device may demodulate and decode the PDCCH candidate group.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
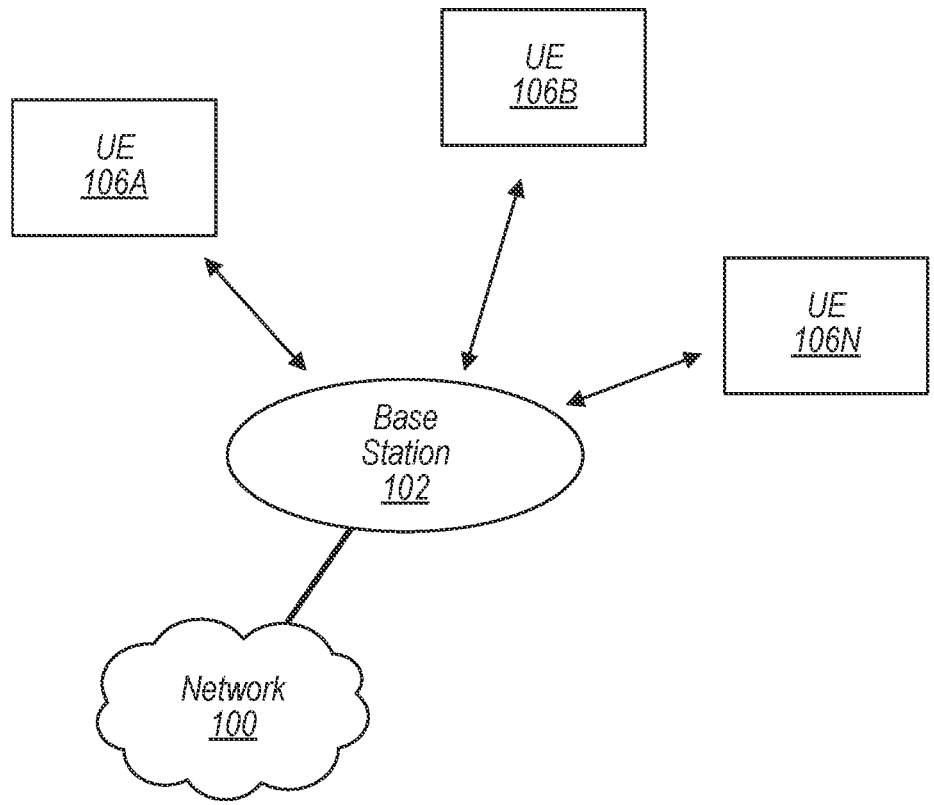
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
DMRS: Demodulation Reference Signal
CORESET: Control Resource Set
PDCCH: Physical Downlink Control Channel
BWP: Bandwidth Part
RE: Resource Element
REG: Resource Element Group
RB: Resource Block
CCE: Control Channel Element
AL: Aggregation Level
DCI: Downlink Control Information
SS: Search Space
CSS: Common Search Space
USS: UE-specific Search Space

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
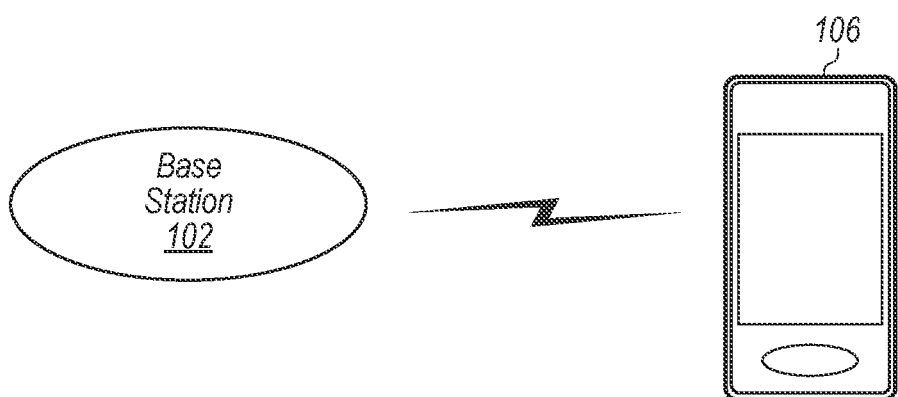
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing blind decoding of downlink control channels with reduced resource consumption, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
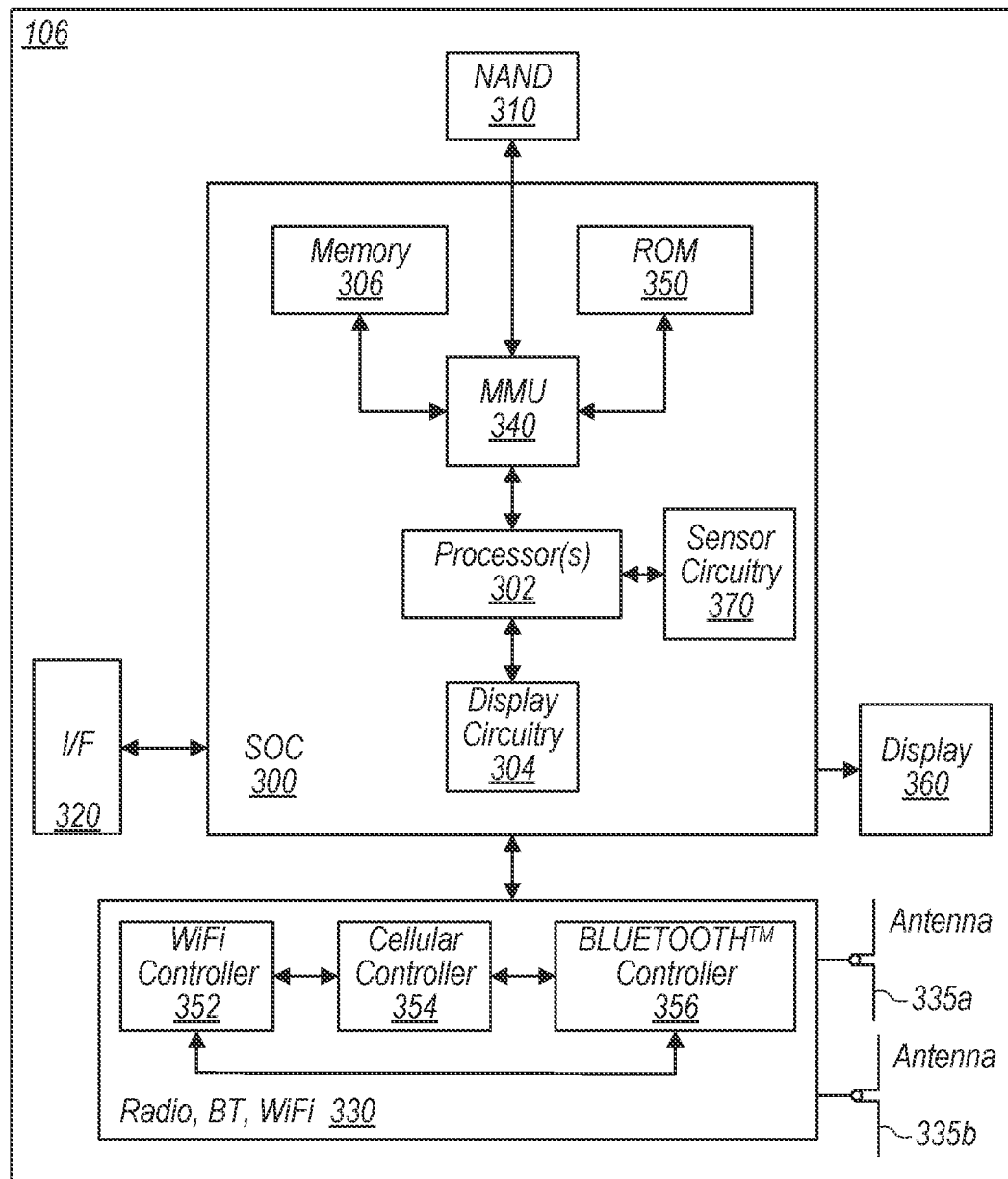
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform blind decoding of downlink control channels with reduced resource consumption, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform blind decoding of downlink control channels with reduced resource consumption according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE, LTE-A, and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
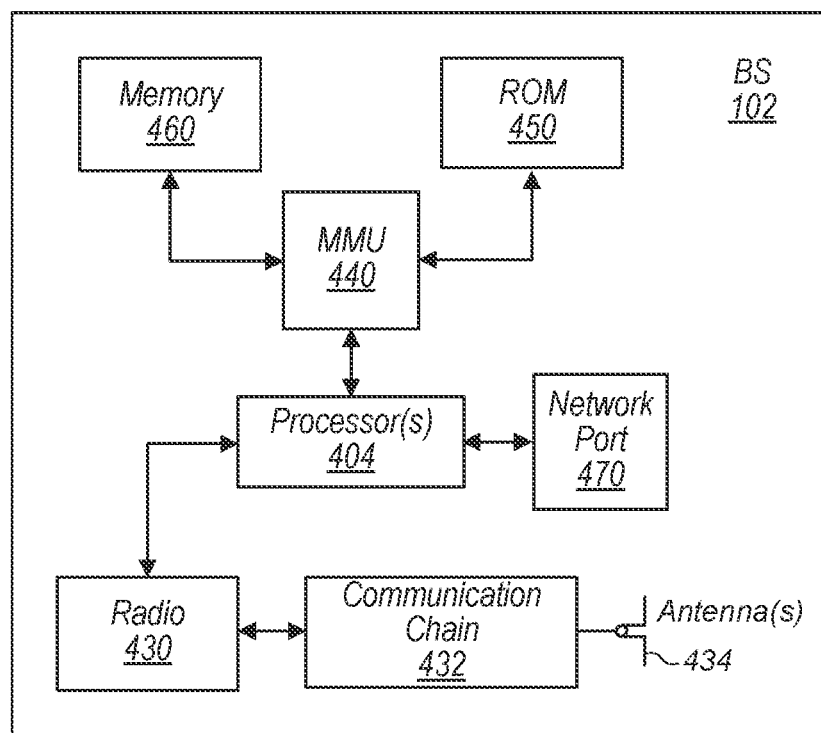
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
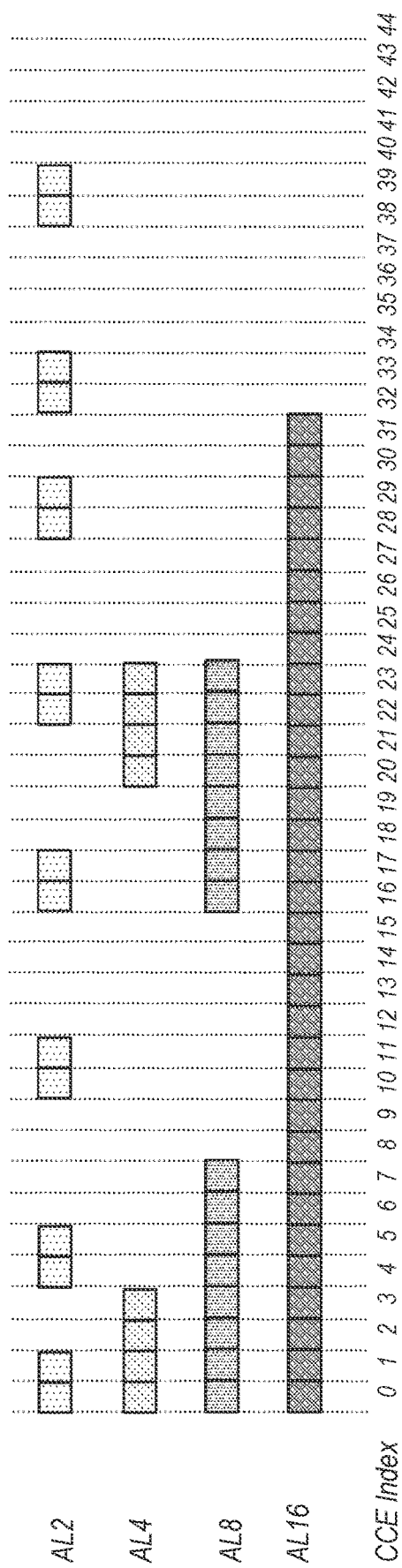
FIG. 5 illustrates an example search space within a control resource set, according to some embodiments.

FIG. 5—CORESET and Search Space Structure

In some wireless communication protocols, such as LTE, LTE-A, and NR, among others, a set of resources may be designated (or reserved, granted, etc.) for use in carrying control signals. For example, for NR, 3GPP has defined a Control Resource Set (CORESET) as a set of physical resources within a specific area in the downlink resource grid, which may be used to carry a Physical Downlink Control Channel (PDCCH). A PDCCH is confined to one CORESET. However, a single CORESET may include 0, 1, or multiple PDCCHs.

A CORESET may be contiguous or non-contiguous. For example, in some scenarios, the CORESET may be split between bandwidth parts (BWPs). A CORESET may be configured in time to span 1-3 consecutive OFDM symbols. The resource elements (REs) of a CORESET are organized into resource element groups (REGs), with each REG consisting of 12 REs of one OFDM symbol in one resource block (RB).

A Control Channel Element (CCE) is also a group of physical resources that can be used to send a PDCCH. Specifically, a PDCCH may consist of a number of Control Channel Elements. For example, a PDCCH may consist of 1, 2, 4, 8, or 16 CCEs, and the number of CCEs may be specified as the CCE aggregation level (AL). These different ALs may accommodate different Downlink Control Information (DCI) payload sizes or different coding rates within the PDCCH. Each CCE may span the same number of symbols as the coreset, and may consist of 6 REGs, resulting in a total of 72 REs. Of these, 54 REs may be used for PDCCH data, while the remaining 18 may be used for a Demodulation Reference Signal (DMRS).

A DMRS is a reference signal that is specific to a particular UE, and is used to estimate the radio channel. Thus, the DMRS may be referred to as a channel pilot signal. The DMRS may include a known scrambling sequence, in which each DMRS RE includes one symbol of the known sequence. Because the DMRS is specific to a UE, the network (e.g., a base station, such as a gNB) may beamform the DMRS, and include it only within the PDCCH to which it pertains—a PDCCH directed to the particular UE. This is distinct from other radio access technologies (RATs) and wireless communication protocols, such as LTE and LTE-A, in that those RATs transmit a common control pilot, which is always present, regardless of whether a particular control channel is present.

A UE, such as the UE 106, may perform blind decoding to monitor for PDCCH. For example, the UE may perform blind decoding on a CORESET, or some portion thereof, to determine whether one or more PDCCH relevant to the UE is present. To reduce the burden of blind decoding the entire CORESET, the network may specify a predetermined search space (SS) which may identify a subset of the CORESET to be searched, while the remainder of the CORESET may not be searched. Specifically, a SS is a set of predetermined CCEs for the UE to monitor for scheduling assignments/grants relating to a certain component carrier. A common search space (CS S) is shared across all UEs, while a UE-specific search space (US S) applies to a specific UE. Certain parameters of a SS, such as the number of PDCCH candidates and the size of the SS (e.g., the number of CCEs included in the SS) may be specified by NR standards documentation, and may vary by SS type and aggregation level.

A PDCCH candidate is a group of CCEs that may potentially contain a PDCCH. PDCCH candidates may vary by DCI format and/or AL. The size of a PDCCH candidate depends on the AL. Thus, a SS may define multiple PDCCH candidates, potentially with overlapping CCEs, having different ALs.

FIG. 5 illustrates an example USS, identifying several PDCCH candidates within a CORESET of 45 CCEs, according to some embodiments. As illustrated, the CCEs are arranged from left to right, each having a respective CCE index, from 0 to 44. Each CCE is included in 0-4 PDCCH candidates of differing AL. It should be understood that FIG. 5 is one example of a USS, and that many other USS configurations are possible.

The top row illustrates PDCCH candidates having AL=2. This means that each PDCCH candidate in the top row includes 2 CCEs. As illustrated, the SS includes 8 such PDCCH candidates. Thus, a PDCCH having AL=2 to be transmitted within this SS may be carried on any of these 8 PDCCH candidates; e.g., on CCEs 0-1, CCEs 4-5, CCEs 10-11, CCEs16-17, etc.

The second row illustrates PDCCH candidates having AL=4. This means that each PDCCH candidate in the second row includes 4 CCEs. As illustrated, the SS includes 2 such PDCCH candidates.

The remaining two rows illustrate candidates having AL=8 and AL=16, respectively, with each row reflecting two PDCCH candidates. It may be noted that the example search space of FIG. 5 does not include any PDCCH candidates having AL=1, although another example SS may include such PDCCH candidates.

As illustrated, some CCEs are included in more than one PDCCH candidate. For example, CCEs 0, 1, 22, and 23 are each included in four PDCCH candidates—one of each illustrated AL. As another example, CCEs 4, 5, 16, and 17 are each included in three PDCCH candidates—one of each of AL=2, AL=8, and AL=16. CCEs 20 and 21 are also each included in three PDCCH candidates—one of each of AL=4, AL=8, and AL=16.

Additionally, it may be noted that CCEs 34-37 and 40-44 are not included in any PDCCH candidate. Thus, these CCEs will never carry a PDCCH while the network is utilizing the illustrated SS of FIG. 5.

To monitor for a PDCCH transmitted within this CORESET, a UE, such as the UE 106, may perform blind decoding on some or all of the PDCCH candidates within this search space, to test whether one or more PDCCH candidate carries a PDCCH. First, for each symbol, the UE may perform channel estimation and noise estimation based on DMRS REs of the SS. Upon completing channel and noise estimation, the UE may demodulate and decode the first PDCCH candidate. For example, the UE may assume that the PDCCH has AL=2, and may demodulate and decode CCEs 0-1 based on that assumption. Upon completing the decoding, the UE may determine whether the result successfully returns a valid DCI value (e.g., using a cyclic redundancy check (CRC)). If so, the UE may conclude that CCEs 0-1 contain a PDCCH having AL=2.

However, if the result does not return a valid DCI value, then the UE may conclude that the CCEs 0-1 do not contain a PDCCH having AL=2. In that scenario, the UE may continue to demodulate and decode CCEs 0-3 based on the assumption that they contain a PDCCH candidate having AL=4. In some implementations, the UE may perform the demodulation and decoding based on the previous channel and noise estimation, and may therefore forego repeating these estimations. The UE may then again determine whether the result returns a valid DCI value. If not, the UE may proceed to test additional PDCCH candidates, such as by demodulating and decoding CCEs 0-7 for a PDCCH having AL=8 and/or CCEs 0-15 for a PDCCH having AL=16.

In some scenarios, each PDCCH candidate may have any one of multiple DCI formats. Thus, the UE may test a given PDCCH candidate (e.g., each attempted PDCCH candidate) multiple times. For example, if each PDCCH candidate in the illustrated SS may have either of two DCI formats, then the UE may first demodulate and decode CCEs 0-1 for a PDCCH having AL=2 with a first DCI format. If the result does not return a valid DCI value, then the UE may demodulate and decode CCEs 0-1 again for a PDCCH having AL=2 with a second DCI format, and may again test whether the result returns a valid DCI value. Each PDCCH candidate attempted by the UE may be tested multiple times in this way, to account for the multiple DCI formats.

It should be understood that a given CCE (e.g., CCE 0) may carry only one PDCCH. Thus, if any PDCCH candidate including that CCE is found to return a valid result, then the UE may forego demodulating and decoding any remaining PDCCH candidates including that CCE. However, a CORE-SET may include multiple PDCCHs. Thus, identifying a PDCCH in a first PDCCH candidate does not preclude the possibility that a second PDCCH candidate may carry another PDCCH, as long as the first and second PDCCH candidates do not include any of the same CCEs.

For example, if the UE determines that CCEs 0-1 include a PDCCH having AL=2, then the UE may forego testing the first PDCCH candidate (i.e., CCEs 0-1) for each of the other AL values. However, the UE may still test whether the second PDCCH candidate having AL=2 (i.e., CCEs 4-5) contains another PDCCH. Each PDCCH candidate having AL=2 may be similarly tested.

It should be understood that the preceding description is one example, and that testing for PDCCH candidates my proceed in an order other than that described above. For example, the UE may first test PDCCH candidates having AL=16. Alternatively, the UE may test all PDCCH candidates having AL=2 before proceeding to test the first PDCCH candidate having AL=4.

It is apparent from the preceding description of blind decoding that a significant amount of power and resources may be used in blind decoding, especially when no PDCCH is present, which results in all PDCCH candidates being tested. For each component carrier (CC), the UE may perform up to 44 blind decodings, and up to 56 CCE channel estimations. Further compounding this burden, this blind decoding may be repeated per CC.

This use of resources may impact important power metrics. For example, in idle mode, a significant percentage of radio power may be consumed in monitoring paging and system information, as the control channel (PDCCH) may continue to be monitored. Thus, reducing the power used to monitor the PDCCH may have a significant impact on battery life in long-term power conservation scenarios. Even in CDRX and connected modes, packets may be received only occasionally, such that a significant portion of CORE-SETs may involve primarily wasted blind decoding.

Thus, methods and systems for reducing power consumption during blind decoding may significantly improve performance of a UE, such as the UE 106.

Figure 6:
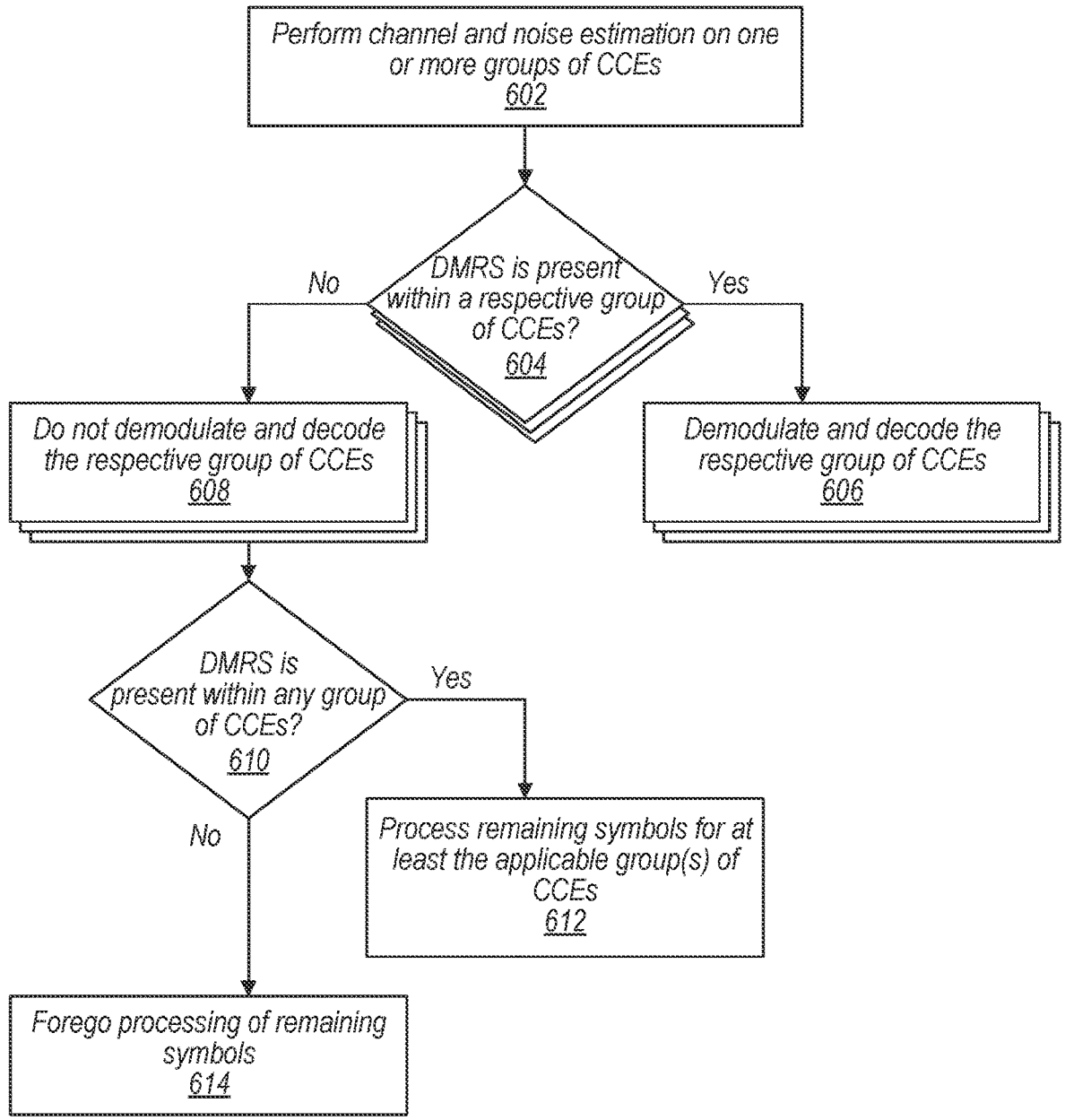
FIG. 6 is a flowchart diagram illustrating a method for performing blind decoding of a PDCCH with reduced power consumption, according to some embodiments.
Figure 7:
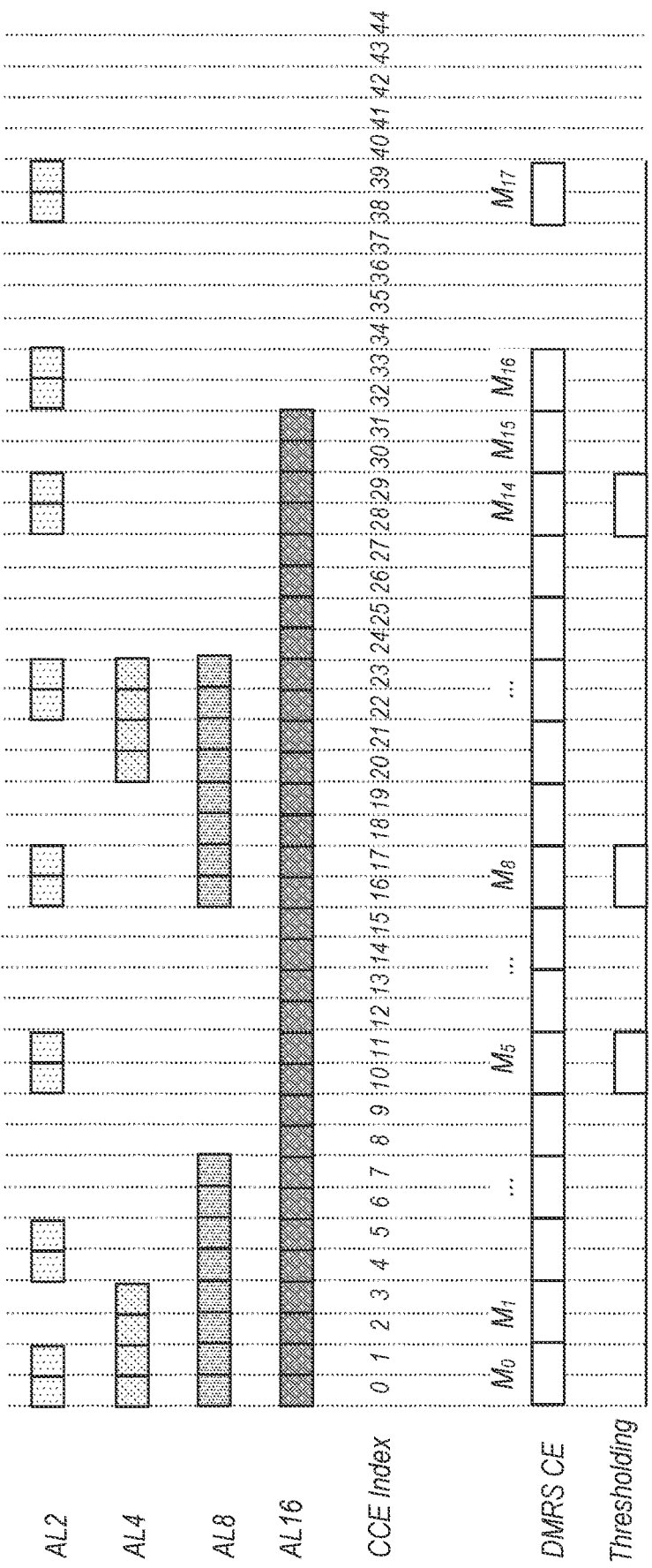
FIG. 7 illustrates an example search space divided into groups of control channel elements, according to some embodiments.
Figure 8:
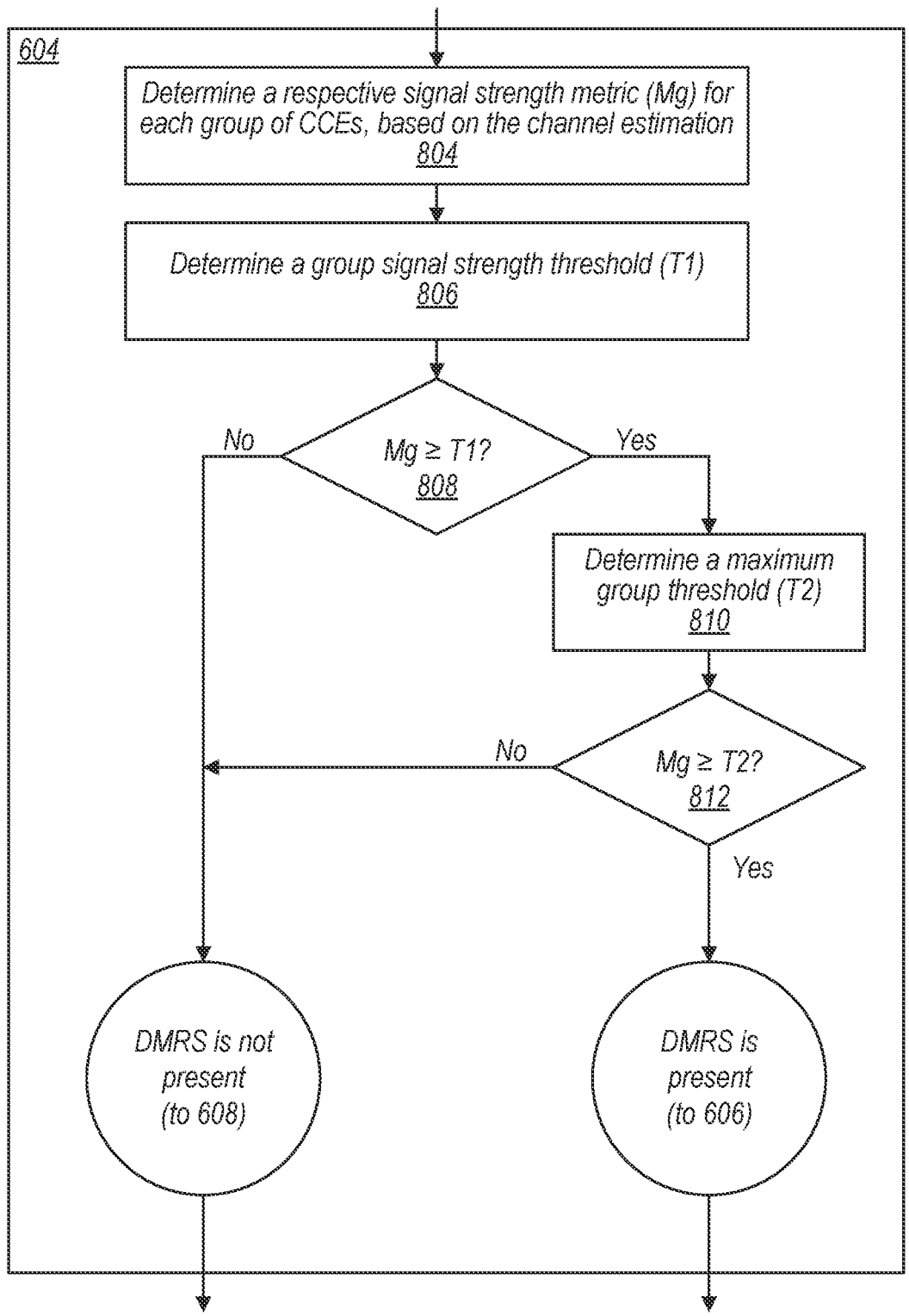
FIG. 8 is a flowchart diagram illustrating further details of the method of FIG. 6, according to some embodiments.

FIGS. 6-8— Reduced Blind Decoding

As noted above, in NR, a DMRS is present only within its corresponding PDCCH. Thus, if the PDCCH is not transmitted, the DMRS is not present within the PDCCH candidate. This feature of NR may be utilized to reduce power consumed during blind decoding.

FIG. 6 illustrates a flowchart diagram illustrating a method for performing blind decoding of a PDCCH with reduced power consumption, according to some embodiments. The method of FIG. 6 may be implemented by a wireless device, such as the UE 106, or by some component thereof, such as by the processor(s) 302 and/or the radio 330 and/or the cellular controller 354.

Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. In various embodiments, some of the elements of the method shown may be performed concurrently, in a different order than shown, may be substituted for by other method elements, or may be omitted. Additional method elements may also be performed as desired. As shown, the method of FIG. 6 may operate as follows.

At 602, the wireless device may perform channel estimation and noise estimation on at least a first symbol of one or more groups of CCEs. In some scenarios, the groups of CCEs may represent (constitute, include, etc.) PDCCH candidates. In some scenarios, a single group of CCEs may represent all CCEs in the CORESET or all CCEs included in a SS. In some scenarios, the wireless device may divide the CORESET into groups of CCEs, wherein each group consists of a number of CCEs equal to the smallest AL value defined for the SS. FIG. 7 illustrates a USS divided in this manner, according to some embodiments. Specifically, FIG. 7 illustrates the same USS as illustrated in FIG. 5, and further illustrates that the CCEs of the USS have been divided into groups of 2, reflecting that the smallest AL value defined for the USS is AL=2. In the scenario illustrated in FIG. 7, the wireless device may perform channel and noise estimation on each of the groups of 2 CCEs in the USS. In particular, FIG. 7 illustrates an example in which DMRS channel estimation (CE) and noise estimation is performed only on the CCEs included in the SS; i.e., only on the CCEs included in at least one PDCCH candidate. Thus, as illustrated, the wireless device may not perform DMRS CE on CCEs 34-37 or 40-44. This may conserve processing resources during the blind decoding process.

At 604, the wireless device may determine whether a DMRS (or other, comparable control channel pilot signal, as may be used in another RAT) is present within a respective group of CCEs. For example, the wireless device may detect the presence of the DMRS within one or more DMRS RE during the channel and noise estimation of 602. It should be understood that any discussion herein of a DMRS being present is intended to reference a DMRS that is directed (or applicable) to the wireless device. Specifically, because each DMRS is specific to a particular UE, a DMRS directed to a first wireless device will not result in a valid DCI value when demodulated and decoded by a second wireless device. Thus, the second wireless device will not detect the presence of the DMRS directed to the first wireless device. A DMRS included in a CSS may be applicable to multiple wireless devices.

If, at 604, the wireless device determines that the DMRS is (or is likely to be) present in the respective group of CCEs, then the wireless device may conclude that a PDCCH is present within the CCEs of the respective group, and may, at 606, demodulate and decode the CCEs within the respective group. For example, the wireless device may perform blind decoding of one or more PDCCH candidate that includes the CCEs of the first group.

If, at 604, the wireless device determines that no DMRS is present within the respective group of CCEs, then the wireless device may conclude that no PDCCH is present, and may, at 608, forego demodulating and decoding the respective group of CCEs. For example, the wireless device may forego performing blind decoding of all PDCCH candidates including the CCEs of the respective group.

In some implementations, 604-608 may be performed for each of a plurality of CCE groups. For example, 604-608 may be performed for each respective group of CCEs within the CORESET or within the applicable SS. Alternatively, performing 604 once may include determining whether each respective group of CCEs includes a DMRS, and either 606 or 608 may be performed for each respective group, based on the determining.

In some implementations, the wireless device may perform the channel and noise estimation at 602 based on all symbols of the one or more groups of CCEs, e.g., to improve detection of the DMRSs by detecting the presence of the DMRSs across multiple symbols. However, in other implementations, the wireless device may be expected to detect the DMRS with sufficient reliability based upon only the first symbol of the CORESET. In such scenarios, additional benefits may be realized by performing the channel and noise estimation at 602 on only the first symbol.

For example, in some implementations, the wireless device may, at 610, determine whether a DMRS is present within the first symbol of any group of CCEs of the CORESET (or of the applicable SS). This determination may be based, e.g., on 604-608 having been performed for each respective group of CCEs, as discussed above. If a DMRS is present in at least one group of CCEs, then the wireless device may, at 612, process any remaining symbols (e.g., second and third symbols, as applicable) for at least the applicable group(s) of CCEs—i.e., the group(s) of CCEs in which a DMRS is present. In some scenarios, this may include repeating 602-608 for any remaining symbols. In other scenarios, the wireless device may, for any remaining symbols, perform blind decoding of only applicable groups in which a DMRS was present in the first symbol, or of only PDCCH candidates that include the CCEs of an applicable group in which a DMRS was present in the first symbol.

However, if at 610, the DMRS is not present within the first symbol of any group of CCEs, then the wireless device may determine that the CORESET (or SS) is empty, containing no PDCCH directed to the UE. Therefore, the wireless device may, at 614, forego processing of remaining symbols of the CORESET. For example, the wireless device may forego performing channel estimation, noise estimation, demodulation, and decoding of any remaining symbols of the CORESET. Additionally, or alternatively, the wireless device may transition RF transceivers into a low-power state, e.g., for the remainder of the CORESET. For example, the wireless device may transition into a low-power state one or more wireless communication transceivers associated with receiving the CORESET, which may include any of receive circuitry, communication chains, baseband processing, etc. Transitioning the transceivers into a low-power state may include, e.g., deactivating or depowering hardware components, reducing processor functionality, reducing a clock rate, and/or other power-reducing measures.

In some scenarios, determining, at 604, whether a DMRS is present may be difficult. For example, a DMRS RE may include some power even when a DMRS is not present, e.g., due to noise, transmission of a DMRS to another wireless device, etc. Thus, additional care may be taken to ensure that such determining is accurate.

FIG. 8 illustrates further example details of how the wireless device may determine whether a DMRS is present within each respective group of CCEs at 604, according to some embodiments. It should be understood that other methods of determining whether a DMRS is present are also envisioned.

As illustrated in FIG. 8, the wireless device may, at 804, determine a group signal strength metric ($M_g$) for each respective group of CCEs. The group signal strength metric $M_g$ may be based on the channel and noise estimation performed at 602. For example, $M_g$ may be defined as follows:

$$M_g = \mathcal{R}\left(\sum_r \sum_{i=1}^{N} \frac{\hat{h}_{r,i}^*}{\hat{\sigma}_r^2} \cdot y_{r,i}\right)$$

Here, $M_g$ represents the real part of the sum of received DMRS samples within the $g^{th}$ group of CCEs, adjusted for noise across all receive antennas. Specifically, $\hat{h}_{r,i}^*$ represents the conjugate of the DMRS estimate at the $r^{th}$ receive antenna and the $i^{th}$ DMRS RE, and $\hat{\sigma}_r^2$ represents the antenna noise variance at the $r^{th}$ antenna. Here, $y_{r,i}$ represents the complex received sample at the $r^{th}$ receive antenna and the $i^{th}$ DMRS RE after removing the DMRS scrambling sequence. In other words, the group signal strength metric $M_g$ may represent an estimated SNR value, or any other appropriate measure of signal strength.

In the example of FIG. 8, the wireless device may utilize groups of CCEs having group size equal to the smallest AL value defined for the SS, as discussed above. For example, applied to the USS of FIG. 7, each group would consist of two CCEs.

At 806, the wireless device may determine a group signal strength threshold ($T_1$). This threshold may represent a minimum signal strength at which the wireless device will conclude that a DMRS may be present, and may represent a SNR or some other appropriate indicator of signal strength. Thus, at 808, the wireless device may determine, for each respective group of CCEs (or for at least a subset of the groups), whether $M_g$ meets $T_1$ (e.g., whether $M_g$ is greater than $T_1$, whether $M_g$ is equal to or greater than $T_1$, etc.). If $M_g$ of a respective group does not meet $T_1$, then the wireless device may determine that a DMRS is not present in the respective group, and may proceed to 608 based on that determination.

As shown above, $M_g$ may take into account multiple DMRS REs (e.g., all DMRS REs included in the CCE group), as sampled by multiple antennas. Thus, $M_g$ may include significant processing gain, relative to considering a single DMRS RE. For example, in the scenario of FIG. 7, each group (consisting of two CCEs) will contain 36 DMRS REs. If such a system is implemented with two active receive antennas, then $M_g$ may have total processing gain equivalent to processing 72 DMRS REs. This suggests that detection of the presence of DMRS within a respective group may be highly reliable. Specifically, the system may be expected to operate at an SNR level that may allow detection of data REs with much lower processing gain. Thus, detection of DMRS REs may be far more reliable than reception of the PDCCH data.

This gain should be accounted for when determining $T_1$. E.g., $T_1$ may be set to a level accounting for this processing gain, rather than a level appropriate for receiving PDCCH data.

If, at 808, the wireless device determines that $M_g$ does meet $T_1$, then the wireless device may conclude that a DMRS may be present in the respective group. In some scenarios, it may be advantageous to select $T_1$ such that a false positive is more likely than a false negative, e.g., because a false positive will result only in less reduction in processing costs, while a false negative may result in failing to receive a PDCCH. Thus, in some implementations, further evaluation may be advantageous before concluding that a DMRS is present in the respective group.

As illustrated in FIG. 8, the wireless device may, at 810, e.g., in response to determining that $M_g$ does meet $T_1$, determine a maximum group threshold ($T_2$). This threshold may represent a percentage (or fraction, etc.) of a highest value from among the group signal strength metrics $M_g$ of the present CORESET (or SS). For example, the wireless device may determine the highest value calculated from among the set of group signal strength metrics determined at 804, and may determine $T_2$ to be a predetermined percentage (e.g., 80% or 90%) of that highest value.

In a scenario in which one or more group of CCEs includes a PDCCH (and thus includes DMRS pilots), it should be expected that the group signal strength metric of that one or more group would be notably greater than the group signal strength metric of a group of CCEs that does not include a PDCCH. Even in a scenario in which a PDCCH is directed to another wireless device on the same CORESET, a PDCCH directed to the correct device is likely to have greater signal strength, due to beamforming of the PDCCH toward a specific wireless device.

Thus, at 812, the wireless device may determine, for each respective group of CCEs (or for at least a subset of the groups), whether $M_g$ meets $T_2$. If $M_g$ of a respective group does not meet $T_2$, then the wireless device may determine that a DMRS is not present in the respective group, and may proceed to 608 based on that determination. If, at 812, $M_g$ of a respective group does meet $T_2$, then the wireless device may determine that a DMRS is (or is likely to be) present in the respective group, and may proceed to 606 based on that determination.

FIG. 7 illustrates an example of possible results of thresholding according to the method of FIG. 8. As illustrated in FIG. 7, in connection with performing DMRS CE, the wireless device may generate $M_g$ for each group of CCEs. Specifically, the present example illustrates Mo through $M_{17}$, as the SS includes 36 CCE, organized in groups of 2.

However, most of these group signal strength metrics fail to meet $T_1$ and/or $T_2$. As illustrated, only $M_5$, $M_8$, and $M_{14}$ meet both $T_1$ and $T_2$. Thus, the wireless device may perform blind decoding of only PDCCH candidates that include the CCEs of those three groups.

In various embodiments, some of the elements shown in FIG. 8 may be performed concurrently, in a different order than shown, may be substituted for by other method elements, or may be omitted. For example, in some implementations, the wireless device may perform only one of 808 or 812. In other implementations, 808 and 812 may be performed concurrently, or in a different order. Other elements, not shown, may be included in some implementations.

In some implementations, the wireless device may further conserver processing resources by prioritizing likely candidates while blind decoding PDCCH candidates. For example, the wireless device may prioritize PDCCH candidates in which all CCEs were determined, at 604, to include a DMRS.

In the specific example illustrated in FIG. 7, only $M_5$, $M_8$, and $M_{14}$ were determined to meet both $T_1$ and $T_2$. Thus, when performing blind decoding, the wireless device may attempt to perform blind decoding on the third, fourth, and sixth PDCCH candidates having AL=2, as those PDCCH candidates include the groups corresponding to $M_5$, $M_8$, and $M_{14}$. If blind decoding failed on the fourth PDCCH candidate having AL=2, then the wireless device may, in some implementations, perform blind decoding on the second PDCCH candidate having AL=8 and/or the second PDCCH candidate having AL=16. However, these PDCCH candidates appear less likely to yield a valid result, as other groups of CCEs included in those PDCCH candidates (e.g., CCEs 18-23) were determined, at 604, to not include a DMRS. Therefore, in some implementations, the wireless device may forego performing blind decoding of these additional PDCCH candidates, instead performing blind decoding only on PDCCH candidates in which all CCEs were found to include a DMRS.

As another example, if the wireless device determines, at 604, that a DMRS is (or is likely to be) present only in CCEs 0-7, then the wireless device may determine that those CCEs correspond to the first PDCCH candidate having AL=8. The wireless device may therefore perform blind decoding on that PDCCH candidate first, e.g., prior to performing blind decoding on the first PDCCH candidate having any other AL value. In some implementations, the wireless device may perform blind decoding on only the first PDCCH candidate having AL=8.

As noted above, false positive determinations of a DMRS may be preferable over a false negative, in which a PDCCH is missed. Therefore, in some implementations, the methods discussed above may be implemented only in scenarios reflecting a high degree of confidence that the wireless device will be able to avoid false negatives. For example, if SNR of the cell is high (e.g., when the wireless device is close to a base station), then the wireless device is very likely to be able to determine whether a DMRS is present within a group of CCEs. In such a scenario, the wireless device may therefore implement the method illustrated in FIG. 6 and/or other methods described herein. However, if SNR is low, then there may be an increased likelihood of the wireless device failing to detect a DMRS. In such a scenario, the wireless device may therefore deactivate, or forego, all or a portion of the method illustrated in FIG. 6 and/or other methods described herein.

For example, in some implementations, the wireless device may determine a cell signal strength threshold ($T_3$). This threshold may represent an averaged cell signal strength below which some or all of the preceding methods may be deactivated. $T_3$ may represent a SNR or some other appropriate indicator of signal strength.

The wireless device may also estimate an averaged cell signal strength value. Because this value represents a cell-wide signal strength, rather than a PDCCH signal strength, it may be calculated based at least in part on REs outside of the CORESET.

For example, when the wireless device is in an idle or inactive mode, the PDCCH may be Quasi-Colocated (QCL) with Synchronization Signal Block (SSB)/Channel Status Information Reference Signal (CSI-RS), which includes synchronization pilots, and may therefore be used to estimate a cell signal strength. As another example, when in connected mode, the wireless device may estimate a cell signal strength based on a Tracking Reference Signal (TSR). As yet another example, the wireless device may compute an averaged reference signal resource element (RSRE) SNR, e.g., as follows:

$$SNR_{cell} = \frac{1}{NN_r} \sum_r \sum_{i=1}^{N} \frac{|\hat{h}_{r,i}|^2}{\hat{\sigma}_r^2}$$

In some scenarios, the wireless device may, before implementing the method of FIG. 6, first determine whether the averaged cell signal strength value meets $T_3$. If so, then the wireless device may proceed to implement the method of FIG. 6, to conserve processing resources during blind decoding. However, if the averaged cell signal strength value does not meet T$_3$, then the wireless device may forego performing the method of FIG. 6, and may perform blind decoding as known in the prior art.

In other scenarios, if the averaged cell signal strength value does not meet T$_3$, then the wireless device may forego only certain aspects of the method of FIG. 6. For example, in some scenarios, if the averaged cell signal strength value does not meet T$_3$, then the wireless device may utilize all symbols of the CORESET in determining whether a DMRS is present within each respective group of CCEs at 604. As another, similar example, if the averaged cell signal strength value does not meet T$_3$, then the wireless device may forego performing 610-614 of the method of FIG. 6, so as to allow processing of each symbol of the CORESET. As another example, if the averaged cell signal strength value does not meet T$_3$, then the wireless device may forego eliminating one or more groups of CCEs from blind decoding based on T$_2$, by foregoing elements 810-812 of FIG. 8. Similarly, the wireless device may forego eliminating one or more groups of CCEs from blind decoding based on T$_1$, by foregoing elements 806-808 of FIG. 8. Other configurations are also envisioned. More generally, if the averaged cell signal strength value does not meet T$_3$, then the wireless device may adapt any of the methods disclosed herein, so as to increase the reliability of detecting a DMRS.

Figure 9:
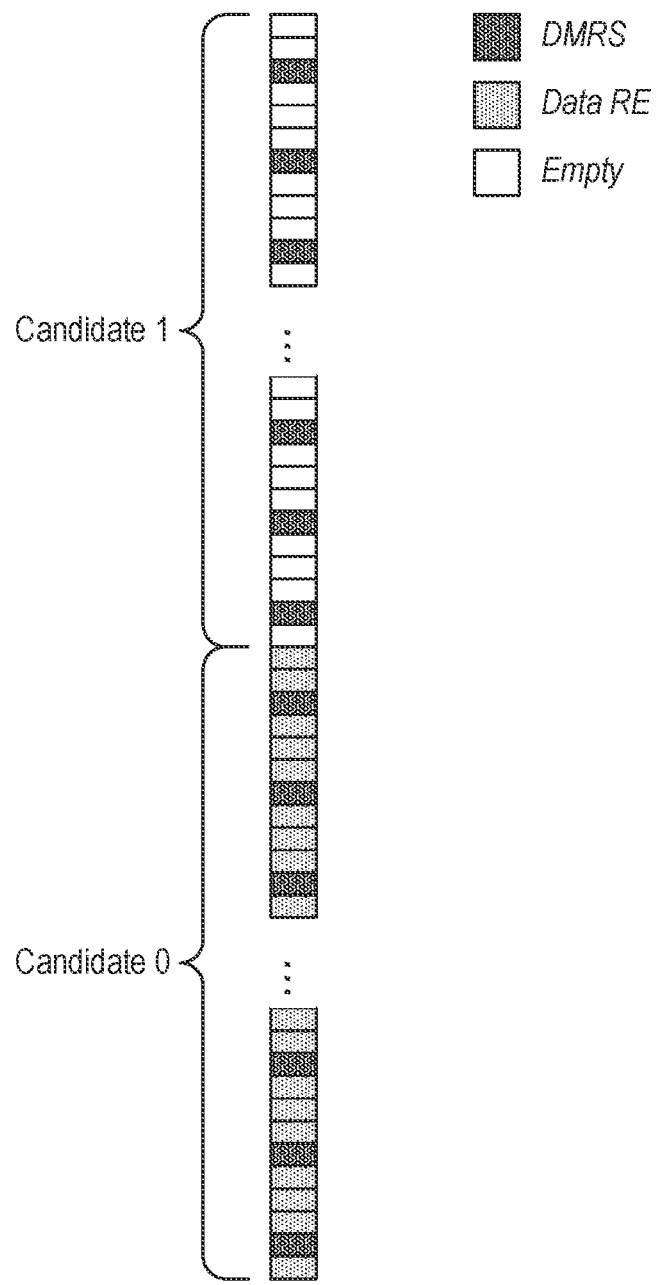
FIG. 9 illustrates an example of a CORESET for use with wideband precoding, according to some embodiments.

FIG. 9—Reduced Blind Decoding with Wideband Precoding

The preceding discussion pertains primarily to narrowband (NB) precoding. However, NR includes both NB precoding and wideband (WB) precoding. For example, WB precoding may be used primarily with millimeter-wave frequencies.

In NR WB precoding, if any PDCCH is transmitted in a CORESET, then the DMRS is included in all CCEs of the CORESET, as opposed to only in the CCEs carrying the PDCCH, as in NB precoding. Thus, if the wireless device detects a DMRS included in a particular CCE group, this does not necessarily indicate that a PDCCH is carried by that CCE group. Further, the wireless device cannot determine how many PDCCHs are included in the CORESET solely by detecting DMRSs, as can be done in NB precoding.

FIG. 9 illustrates an example of a CORESET (or a portion thereof) for use with WB precoding. Such a CORESET may include a maximum of 4 contiguous RB groups. However, the most typical case may be that the CORESET includes a single contiguous RB group. Typically, PDCCHs for different UEs are time-division multiplexed, especially for USS. As illustrated in FIG. 9, this CORESET includes a PDCCH within PDCCH candidate 0, and does not carry a PDCCH within PDCCH candidate 1. Specifically, the data REs of PDCCH candidate 0 contain data, while the data REs of PDCCH candidate 1 do not. By contrast, the DMRS REs of both PDCCH candidates contain the DMRS.

Figure 10:
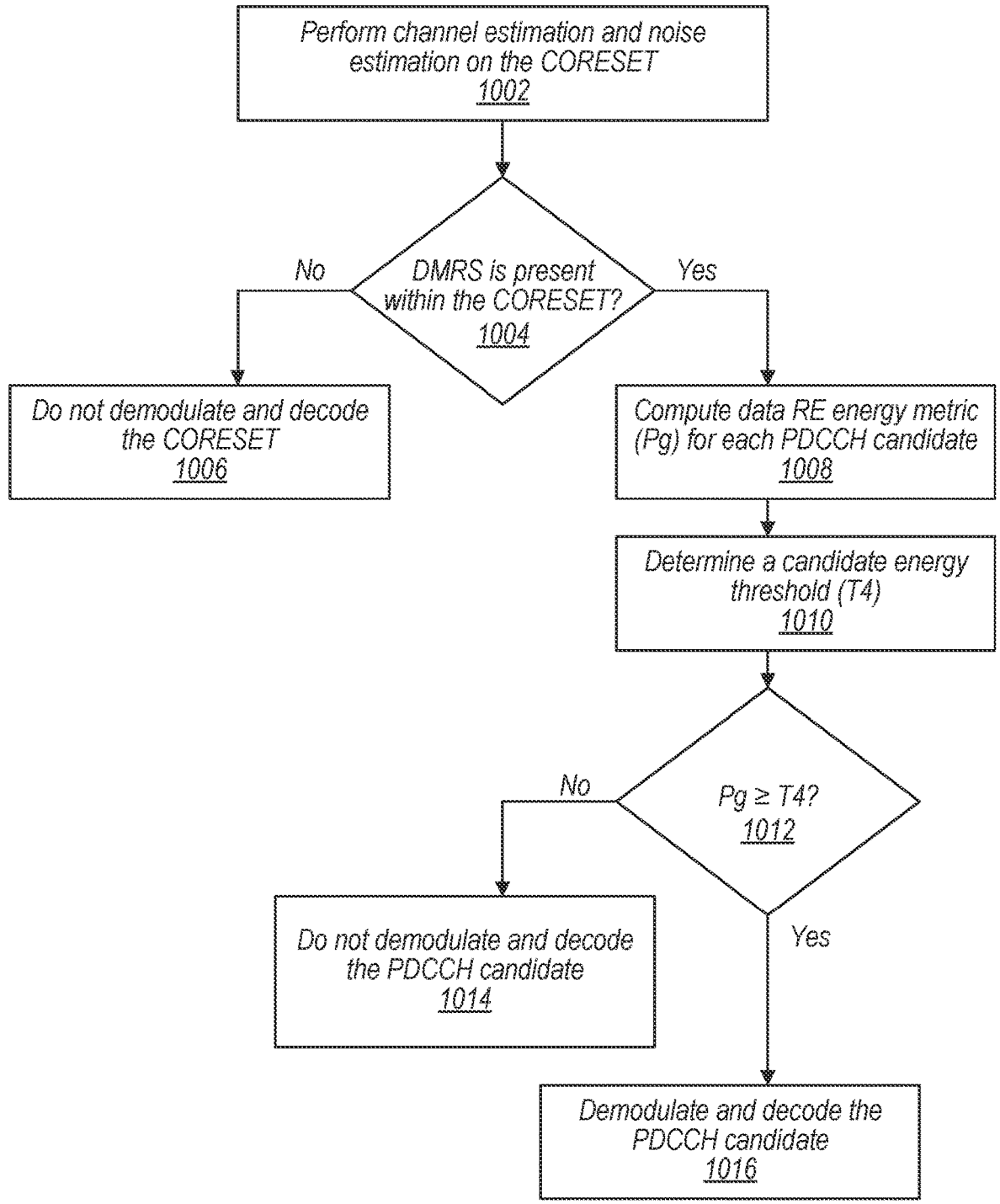
FIG. 10 is a flowchart diagram illustrating a method for performing blind decoding of a PDCCH with reduced power consumption with wideband precoding, according to some embodiments.

FIG. 10 illustrates a flowchart diagram illustrating a method for performing blind decoding of a PDCCH with reduced power consumption for WB precoding, according to some embodiments. The method of FIG. 10 may be implemented by a wireless device, such as the UE 106, or by some component thereof, such as by the processor(s) 302 and/or the radio 330 and/or the cellular controller 354.

Note that while at least some elements of the method of FIG. 10 are described in a manner relating to the use of communication techniques and/or features associated with 3GPP and/or NR specification documents, such description is not intended to be limiting to the disclosure, and aspects of the method of FIG. 10 may be used in any suitable wireless communication system, as desired. In various embodiments, some of the elements of the method shown may be performed concurrently, in a different order than shown, may be substituted for by other method elements, or may be omitted. Additional method elements may also be performed as desired. As shown, the method of FIG. 10 may operate as follows.

At 1002, the wireless device may perform channel estimation and noise estimation on the CORESET, which may include one or more PDCCH candidates.

At 1004, the wireless device may determine whether a DMRS (or other, comparable control channel pilot signal, as may be used in another RAT) is present within the CORESET. For example, the wireless device may detect the presence of the DMRS within one or more DMRS RE during the channel and noise estimation of 1002.

It may be noted that 1002 and 1004 may be equivalent to 602 and 604 in the scenario in which a single group of CCEs represents all CCEs in the CORESET. For example, in determining whether the DMRS is present at 1004, the wireless device may perform steps equivalent to 804-810. In such a scenario, a single group signal strength metric Mo may be calculated as discussed above, for a group consisting of the entire CORESET.

If, at 1004, the wireless device determines that no DMRS is present in the CORESET, then the wireless device may conclude that no PDCCH is present, and may, at 1006, forego demodulating and decoding the CORESET. This may result in conservation of power and other processing resources.

If, at 1004, the wireless device determines that the DMRS is (or is likely to be) present in the CORESET, then the wireless device may conclude that a PDCCH is present within the CORESET. However, the wireless device may not yet know which PDCCH candidate(s) contains the PDCCH.

Therefore, the wireless device may, at 1008, compute a data RE energy metric (P$_g$) for each PDCCH candidate. P$_g$ may represent a sum of the energy received in the data REs of the g$^{th}$ PDCCH candidate. For example, P$_g$ may be defined as follows:

$$P_g = \sum_r \sum_i |y_{r,i}|^2$$

At 1010, the wireless device may determine a candidate energy threshold (T$_4$). This threshold may represent a minimum energy level at which the wireless device will conclude that the data REs are carrying PDCCH data. In some scenarios, T$_4$ may be based at least partly on the power present on the DMRS REs, with the assumption that occupied data REs may manifest a similar power level. Thus, at 1012, the wireless device may determine, for each respective PDCCH candidate, whether P$_g$ meets T$_4$. If P$_g$ of a respective group does not meet T$_4$, then the wireless device may determine that the respective PDCCH candidate does not contain a PDCCH, and may, at 1014, forego demodulating and decoding the respective PDCCH candidate.

However, if at 1012, the wireless device determines that P$_g$ of a respective group does meet T$_4$, then the wireless device may determine that the respective PDCCH candidate does (or is likely to) contain a PDCCH, and may, at 1016, demodulate and decode the respective PDCCH candidate. In this way, the wireless device may reduce consumption of power and other processing resources, by avoiding demodulating and decoding empty PDCCH candidates.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of monitoring for a control channel, the method comprising:
by a wireless communication device:
determining whether a control channel pilot signal is present within at least a first symbol of a first group of control channel elements (CCEs) of a control resource set,
wherein determining whether the control channel pilot signal is present within at least the first symbol of the first group of CCEs comprises:
determining a respective signal strength metric for each of a plurality of groups of CCEs of the control resource set;
determining a maximum group threshold (T2), representing a predetermined percentage of a greatest signal strength metric of the respective signal strength metrics; and
determining that the control channel pilot signal is not present within at least the first symbol of the first group of CCEs when the signal strength metric for at least the first symbol of the first group of CCEs does not meet T2;
at least partly in response to determining that the control channel pilot signal is present within at least the first symbol of the first group of CCEs, demodulating and decoding the at least the first symbol of the first group of CCEs; and
in response to determining that the control channel pilot signal is not present within at least the first symbol of the first group of CCEs, foregoing demodulation and decoding of the first group of CCEs.

2. The method of claim 1, further comprising:
by the wireless communication device:
determining whether the control channel pilot signal is present within the first symbol of any group of CCEs of the control resource set;
at least partly in response to determining that the control channel pilot signal is present within the first symbol of at least one group of CCEs, processing subsequent symbols of the at least one group of CCEs; and
in response to determining that the control channel pilot signal is not present within the first symbol of any group of CCEs of the control resource set, foregoing processing of the remaining symbols of the control resource set.

3. The method according to claim 2, wherein foregoing processing includes foregoing demodulation and decoding of the remaining symbols of the control resource set.

4. The method according to claim 2, wherein foregoing processing includes transitioning transceiver circuitry configured to receive the control resource set to a low-power state.

5. The method according to claim 1, wherein determining whether the control channel pilot signal is present within at least the first symbol of the first group of CCEs comprises:
determining a signal strength metric for at least the first symbol of the first group of CCEs; and
determining that the control channel pilot signal is not present within at least the first symbol of the first group of CCEs when the signal strength metric does not meet a group signal strength threshold (T1).

6. The method according to claim 5, wherein the signal strength metric for at least the first symbol of the first group of CCEs is based on a sum of received samples of resource elements reserved for the control channel pilot symbol within the first group of CCEs.

7. The method according to claim 1, wherein the first group of CCEs includes a number of CCEs equal to a minimum aggregation level of the control resource set.

8. The method according to claim 1, wherein the first group of CCEs includes all CCEs of the control resource set.

9. The method according to claim 1, wherein the first group of CCEs includes all CCEs of a predefined search space of the control resource set.

10. An apparatus, comprising:
a processor configured to cause a wireless device to:
perform channel estimation and noise estimation on at least a first symbol of a first group of control channel elements (CCEs) of a control resource set;

determine a signal strength metric for the first group of CCEs, based on the channel estimation and noise estimation;

determine whether the signal strength metric meets a group signal strength threshold (T1);

at least partly in response to determining that the signal strength metric meets T1, demodulate and decode the at least the first symbol of the first group of CCEs; and in response to determining that the signal strength metric does not meet T1, forego demodulation and decoding of the first group of CCEs.

11. The apparatus of claim 10, wherein the processor is further configured to cause the wireless device to determine T1 based on at least one of:

a number of receive antennas being used to receive the first group of CCEs; or a number of CCEs included in the first group of CCEs.

12. The apparatus of claim 10, wherein the processor is further configured to cause the wireless device to:

determine a respective signal strength metric for each of a plurality of groups of CCEs of the control resource set;

determine a relative threshold (T2), wherein T2 represents a predetermined percentage of a highest signal strength metric of the respective signal strength metrics; and in response to determining that the signal strength metric for the first group of CCEs does not meet T2, foregoing demodulation and decoding of the at least the first symbol of the first group of CCEs;

wherein demodulating and decoding the at least the first symbol of the first group of CCEs is further in response to determining that the signal strength metric for the first group of CCEs meets T2.

13. The apparatus of claim 10, wherein the processor is further configured to cause the wireless device to:

determine an average cell signal strength metric, based at least in part on a signal strength of resource elements outside the control resource set;

determine whether the average cell signal strength metric meets an average cell signal strength threshold (T3); and in response to determining that the average cell signal strength metric does not meet T3, demodulate and decode the at least the first symbol of the first group of CCEs without regard to whether the signal strength metric meets T1.

14. The apparatus of claim 10, wherein the signal strength metric for the first group of CCEs is based on a sum of received samples of resource elements reserved for demodulation reference signals (DMRSs) within the first group of CCEs.

15. The apparatus of claim 10, wherein said channel estimation and noise estimation are performed on only the first symbol of the first group of CCEs of the control resource set, and wherein the processor is further configured to cause the wireless device to:

at least partly in response to determining that the signal strength metric does not meet T1, forego performing channel estimation and noise estimation on remaining symbols of the first group of CCEs of the control resource set.

16. The apparatus of claim 10, wherein said channel estimation and noise estimation are performed on only the first symbol of the first group of CCEs of the control resource set, and wherein the processor is further configured to cause the wireless device to:

determine a respective signal strength metric for the first symbol of each of a plurality of groups of CCEs of the control resource set;

determine whether the respective signal strength metrics meet T1; and at least partly in response to determining that none of the respective signal strength metrics meets T1, transition wireless communication transceivers associated with receiving the control resource set into a low-power state for the remainder of the control resource set.

17. The apparatus of claim 10, wherein the processor is further configured to cause the wireless device to:

determine energy associated with data resource elements of a PDCCH candidate group of the control resource set; and at least party in response to determining that the determined energy meets a candidate group threshold, demodulate and decode the PDCCH candidate group.

18. A non-transitory computer-readable memory medium storing software instructions configured to, when executed by a processor of a wireless communication device, cause the wireless communication device to:

determine whether a control channel pilot signal is present within at least a first symbol of a first group of control channel elements (CCEs) of a control resource set;

at least partly in response to determining that the control channel pilot signal is present within at least the first symbol of the first group of CCEs, demodulate and decode the at least the first symbol of the first group of CCEs;

in response to determining that the control channel pilot signal is not present within at least the first symbol of the first group of CCEs, forego demodulation and decoding of the first group of CCEs;

determining energy associated with data resource elements of a PDCCH candidate group of the control resource set; and at least partly in response to determining that the determined energy meets a candidate energy threshold, demodulating and decoding the PDCCH candidate group.

* * * * *